United States Patent [19]

Lambert, Jr.

[11] 4,189,429
[45] Feb. 19, 1980

[54] HYDROLYZABLE SILYL-SUBSTITUTED DYESTUFFS FOR TRANSFER PRINTING

[75] Inventor: Robert L. Lambert, Jr., Saint Paul, Minn.

[73] Assignee: Minnesota Mining and Manufacturing Company, Saint Paul, Minn.

[21] Appl. No.: 903,893

[22] Filed: May 8, 1978

[51] Int. Cl.² .............. C09B 1/16; C09B 23/02; C09B 23/16; C09B 29/08
[52] U.S. Cl. ............... 260/207.5; 8/2.5 A; 8/7; 8/62; 260/155; 260/158; 260/205; 260/206; 260/378; 260/379; 260/380; 260/381; 260/448.2 B; 260/448.2 N; 260/448.8 R; 427/288; 542/449; 542/455; 548/110
[58] Field of Search ............ 260/205, 206, 207, 207.1, 260/207.5, 380, 448.2 B, 448.8 R, 155, 158, 304 C, 307 D, 378, 379, 381; 542/455; 544/449

[56] References Cited

U.S. PATENT DOCUMENTS

| | | | |
|---|---|---|---|
| 2,715,133 | 8/1955 | Speier | 260/205 X |
| 2,925,313 | 2/1960 | Bailey et al. | 260/205 X |
| 2,931,693 | 4/1960 | Bailey et al. | 260/205 X |
| 2,934,459 | 4/1960 | Canouai | 117/126 |
| 3,920,695 | 11/1975 | Smith et al. | 260/205 X |

FOREIGN PATENT DOCUMENTS 108781 11/1963 Czechoslovakia ............... 260/205

Primary Examiner—Floyd D. Higel
Attorney, Agent, or Firm—Cruzan Alexander; Donald M. Sell; Richard Francis

[57] ABSTRACT

Volatile, hydrolyzable silyl-substituted dyestuffs are used in transfer sheets which, by heating, transfer an image to a substrate. The image has high optical density and resistance to diffusion in high temperature environments. The dyestuffs are of the formula

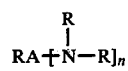

wherein A is a dyestuff nucleus selected from anthraquinone, naphthoquinone, phenylazophenyl or styryl, which nucleus is substituted by R and may be substituted by auxochromic or bathochromic groups, R is H, alkyl of 1 to 6 carbon atoms, phenyl or Q, and at least one R is Q, Q is $-R^1-W-Si(R^2)_3$, $R^1$ is a divalent aliphatic group of 2 to 10 carbon atoms, W is O, S or $NR^3$, $R^3$ is H, alkyl of 1 to 6 carbon atoms or phenyl and each $R^2$ is individually the same or different selected from hydrogen, hydrocarbyl, hydrocarbyloxy, chlorohydrocarbyl or bromohydrocarbyl in which the sum of carbons is not greater than 12.

8 Claims, No Drawings

HYDROLYZABLE SILYL-SUBSTITUTED DYESTUFFS FOR TRANSFER PRINTING

This invention relates to the heat transfer printing process and particularly to dyes for use in the heat transfer process which produce images that are fast to heat and solvents. More particularly this invention relates to dyestuffs comprising trialkylsilyloxy groups.

DESCRIPTION OF THE PRIOR ART

Heat transfer printing is a process for providing a substrate, generally a paper, fabric, film or foil, with a printed image by printing a temporary support with an ink containing a volatile dye, placing the printed temporary support into contact with the substrate and heating the assembly to cause vaporization of the dye and its transfer to the support to provide a dye image in or on the support.

Heat transfer printing processes and dyes suitable for use in such processes are well known. U.S. Pat. Nos. 3,647,503 and 3,806,069, among others, teach that a receptor sheet such as polyester fabric may be printed by vapor transfer of a volatile dye from a transfer paper to the fabric. Suitable classes of dyes include styryl dyes, triphenylmethane dyes, dispersed dyes, azo dyes, anthraquinone dyes, etc. Such classes of dyes possess varying degrees of volatility and solubility. The more volatile and soluble dyes provide images having excellent optical density, but because of these very properties are not entirely satisfactory for use with substrates which are to be used at high temperature or in fluid environments because the dyes may diffuse from or be extracted from the substrate. Less volatile and less soluble dyes, on the other hand, provide printed substrates which are somewhat more useful, i.e., more fast, at elevated temperatures or in fluid environments but, because of the reduced volatility of the dyes, the optical density of the printed image obtained on the substrates is low.

A number of heat transfer dyes which are sufficiently volatile to provide images having high optical density and yet achieve stability in high temperature and fluid environments are disclosed in British Pat. Nos. 1,344,991 and 1,412,963. These dyes possess a group capable of forming a carbene or nitrene radical upon heating and include azo and anthraquinone dyes having groups such as —$N_3$, —$CON_3$, —$SO_2N_3$, —$CX_3$ (e.g., —$CCl_3$ and —$CBr_3$) and the like. Such dyes have the disadvantages that their thermal decomposition may produce harmful side products such as $HN_3$, $Cl_2$ and $Br_2$ and, furthermore, compounds possessing an azide group are of uncertain safety because of the well known toxicity of azides generally.

Classes of heat transfer dyes having haloacyloxyalkylamino substituents are suggested in Belgian Pat. No. 842,784 (azo dyes) and in German DOS 2,623,224 (anthraquinone dyes). The halogen of the dyestuff reacts with a reactive hydrogen of the substrate onto which it is volatilized to fix the dye to the substrate but with the disadvantage of simultaneously liberating hydrogen halide.

It is one object of this invention to provide dyestuffs for use in heat transfer processes which are readily soluble in common solvents and are readily volatile and which, when heat transferred, provide images in or on a substrate which are resistant to diffusion in hot and/or fluid environments and which are heat transferred without degradation to noxious by-products. Other objects will be evident herein elsewhere.

SUMMARY OF THE INVENTION

In accordance with the above and other objects of the invention it has been found that volatile dyestuffs which are soluble in common solvents and are especially suitable for use in heat transfer printing processes are the volatile, hydrolyzable silyl-substituted dyestuffs of the general formula:

wherein A is a dyestuff nucleus substituted by R which, if desired, can be further substituted by auxochromic or bathochromic groups, e.g., $NO_2$, Cl, alkyl, alkyloxy and the like but not by salt groups such as the sodium sulfonate group, and preferably is anthraquinone, naphthoquinone, phenylazophenyl, i.e., (phenyl) (phenyl)-diazene, or a styryl nucleus; R is H, $C_1$ to $C_6$ alkyl, phenyl or Q, at least one R is Q, and Q is:

in which $R^1$ is a nonhydrolyzable divalent aliphatic, cycloaliphatic or phenylaliphatic linking group of 2 to 10 carbon atoms containing no more than one O or N atom per each two carbon atoms and plurality of O or N atom being separated from one another by at least two C atoms, the phenyl group being separated from W by at least two C atoms; W is O, S or $NR^3$ in which $R^3$ is hydrogen, alkyl of 1 to 6 carbon atoms or phenyl; each $R^2$ is individually the same or different selected from hydrogen, hydrocarbyl, hydrocarbyloxy, chlorohydrocarbyl, chlorohydrocarbyloxy or bromohydrocarbyloxy, in which the sum of the carbons in $R^2$ is no greater than 12 and preferably each of $R^2$ is methyl; and n is 1, 2 or 3.

In referring to the dyestuffs of the invention reference is made herein to substantivity which term is intended to imply fastness, that is, relative difficulty of removal as well as to the possibility of substantivity in which the dyestuff reacts to some degree with the substrate.

The preferred volatile hydrolyzable silyl-substituted anthraquinone dyestuffs have the formula:

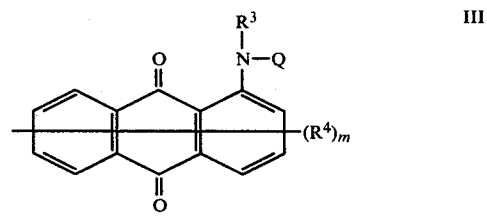

wherein $R^3$ and Q are as defined above and R is a group independently selected from $NO_2$, Cl, Br, $R^3$, $OR^3$, $SR^3$, $NHR^3$ and $N(R^3)_2$; which group $R^4$ may substitute m nuclear hydrogens in positions 2 through 8 of the anthraquinone nucleus and which when in the 4, 5 or 8 position of the nucleus can also be $NR^3Q$; and m is 0, 1, 2 or 3.

The preferred volatile, hydrolyzable silyl-substituted azo dyes (sometimes known as diazene dyes) have the formula:

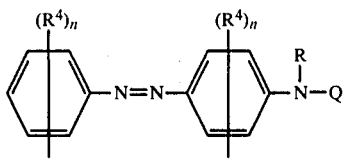

wherein R, R⁴ and Q are as defined above; which groups R⁴ substitute nuclear hydrogens of the respective rings and, when in the 4-position, R⁴ is preferably NO₂; and each n is independently 0, 1 or 2.

The preferred volatile, hydrolyzable silyl-substituted styryl dyes have the formula:

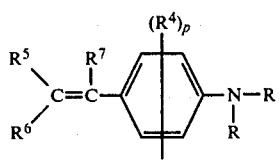

wherein R and R⁴ are as defined above; p is 0, 1, 2, or 3; R⁵ and R⁶ are individually selected from CN, R³, SO₂R⁸, COOR and phenyl substituted by one of Cl, CH₃, and OCH₃ and R⁵ and R⁶ taken together with the C= can be:

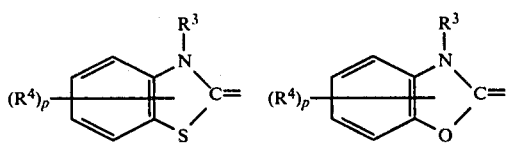

in which R³, R⁴ and p are as defined above; R⁷ is R⁵ or H; R⁸ is CF₃, alkyl, cycloalkyl or aryl having 1 to 7 carbon atoms, with the proviso that at least one R is Q.

The dyestuffs of the invention are prepared by the reaction of a halosilane:

wherein R² is as defined above and X is chlorine or bromine, with a precursor hydroxy-, amino- or thio-aliphatic aminosubstituted dyestuff of the formula:

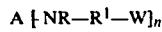

wherein A, R, R¹, W and n are as defined above. Because the product silyl-substituted dyes of the invention are hydrolytically unstable, classical dye syntheses using aqueous systems are not applicable. The reaction of the hydroxy-, amino- or thio-aliphatic amino-substituted dyestuff with the halosilane is conveniently effected in a nonaqueous solvent, such as tetrahydrofurane, in the presence of an acid acceptor such as triethylamine, imidazole, pyridine, etc. Generally, about 1.1 to 1.5 equivalents of halosilane is used per equivalent of hydroxy-, amino- or thio-functionality, however, one to two or more equivalents can be used. Because the reaction is mildly exothermic, application of heat may not be necessary to complete the reaction but heating the reaction mixture to 50° C. or more can be used to accelerate the reaction. Depending on the exact temperatures, concentrations of reactants and solvent, the reaction is substantially complete in from about 1 minute to 24 hours.

The precursor dyestuffs are well known. Preparation of hydroxyaliphatic amino-substituted anthraquinones are described in many references including, for example, Venkataraman, *Synthetic Dyes,* Vol. II, page 808 et seq., Academic Press, Inc. (1952); U.S. Pat. No. 2,466,008 (trifluoro-substituted with an alkoxyalkoxy aliphatic chain); and U.S. Pat. No. 2,727,045 [bis(hydroxyalkyl) groups].

Preparation of aminoaliphatic amino-substituted anthraquinones is also well known and described in many references including, for example: Simon, J. Am. Chem. Soc. 85, 1974 (1963); Greenhalgh and Hughes, J. Chem. Soc. (C) 1968, 1284; German Patent 1,082,916 (C.A., 56, 47003e) and French Pat. No. 1,516,943 [C.A. 71, 92651e (1969)].

The precursor hydroxy-, amino- or thio-aliphatic amino-substituted anthraquinone are generally prepared by heating a 1- or 1,4-di-halo-, hydroxy- or nitro-anthraquinone with a corresponding hydroxy-, amino- or thio-aliphaticamine, suitably in a solvent such as acetonitrile, tetrahydrofurane or toluene, at a temperature between about 50° and 150° C. and isolating the reaction product.

Many precursor hydroxy-, amino- and thio-aliphaticamido-anthraquinones are available commercially and include those set forth in Table I.

Table I

| Chemical Name | Common Name | Color Index No. |
|---|---|---|
| 1-(2-hydroxyethylamino)anthraquinone | C.I. Disperse Red 3 | 60507 |
| 1-methylamino-4-(2-hydroxyethylamino)anthraquinone | C.I. Disperse Blue 3 | 61505 |
| 1-methylamino-4-[2-(2-hydroxyethoxy)ethoxyamino]anthraquinone | C.I. Disperse Blue 34 | 61510 |
| 1,4-bis(2-hydroxyethylamino)-anthraquinone | C.I. Disperse Blue 23 | 61545 |
| 1,4-bis(2-hydroxyethylamino)-5,8-bishydroxyanthraquinone | C.I. Disperse Blue 7 | 62500 |
| 1,4-bis(2-hydroxy-3-chloropropylamino)-5-nitroanthraquinone | | 62505 |

The Color Index lists many hydroxyaliphaticaminoazo compounds which are suitable for preparatiion of the volatile hydrolyzable silyl-substituted dyestuffs of the invention. Included, for example, are those set forth in Table II, named as (hydroxyaliphaticaminophenyl) (phenyl)diazenes in accordance with the recommendations in *Nomenclature of Organic Compounds,* Fletcher et al., American Chemical Society (1974), together with Color Index designations.

TABLE II

{4-[N-ethyl-N-(2-hydroxyethyl)amino]phenyl}(4-nitrophenyl)diazene - C.I. Disperse Red 1 (C.I. 11110)

{4-[N-ethyl-N-(2-hydroxyethyl)amino]phenyl}(2-chloro-4-nitrophenyl)diazene - C.I. Disperse Red 13 (C.I. 11115)

{4-[N-ethyl-N-(2-hydroxyethyl) amino]phenyl}(2,6-dichloro-4-nitrophenyl)diazene - C.I. Disperse Orange 5 (C.I. 11100)

{4-[N-ethyl-N-(2,3-dihydroxypropyl)amino]phenyl}(4-nitrophenyl)diazene - C.I. Disperse Red 2 (C.I. 11118)

{4-[N-butyl-N-(2-hydroxyethyl)amino]phenyl}(2,4-dinitrophenyl)diazene - C.I. Disperse Violet 12 (C.I. 11120)

{4-[N,N-bis(2-hydroxyethyl)amino]phenyl}(phenyl)-
  diazene - C.I. Solvent Yellow 58 (C.I. 11129)
{2-chloro-4-[N,N-bis(2-hydroxyethyl)amino]-
  phenyl}(4-nitrophenyl)diazene - C.I. Disperse Red 7
  (C.I. 11150)
{4-[N-(2-hydroxyethyl)amino]-2-methylphenyl}(4-
  nitrophenyl)diazene - Celliton Red R (C.I. 11180)
{4-[N,N-bis(2-hydroxethyl)amino]-2-methlphenyl}(4-
  nitrophenyl)diazene - C.I. Disperse Red 17 (C.I.
  11210)
{4-[N-butyl-N-(2-hydroxyethyl)amino]-2-methyl-
  phenyl](2-bromo-4,6-dinitrophenyl)diazene - C.I.
  Disperse Violet 24 (C.I. 11200)
{4-[N-butyl-N-(2-hydroxethyl)amino]-2-methyl-6-
  methoxyphenyl}(2-bromo-4,6-dinitrophenyl)diazene
  - Celliton Discharge Blue 3R (C.I. 11205)
{4-[N,N-bis(2-hydroxyethyl)amino]-2-methyl-
  phenyl}(2-chloro-4-nitrophenyl)diazene - C.I. Dis-
  perse Red 5 (C.I. 11215)
{4-[N,N-bis(2-hydroxyethyl)amino]-2-methyl-
  phenyl}(4-amino-2-methoxyphenyl)diazene - C.I.
  Disperse Black 4 (C.I. 11220)
{4-[N,N-bis(2-hydroxyethyl)amino]-2-methyl-
  phenyl}(2-hydroxy-4-nitrophenyl)diazene - C.I. Dis-
  perse Red 16 (C.I. 11225)
{4-[N,N-bis(2-hydroxyethyl)amino]phenyl}(5-methox-
  ybenzthiazol-2-yl)diazene - C.I. Disperse Red 58 (C.I.
  11135)
(1-butyl-3-hydroxy-7-methyl-1,2,3,4-tetrahydroquinol-
  6-yl)(2-bromo-4,6-dinitrophenyl)diazene - C.I. Dis-
  perse Violet 7 (C.I. 11410)

Styryl dyes for use as precursors in the preparation of the hydrolyzable silyl dyes of the invention are well known. Suitable styryl dyes and their preparation are described in, among other publications, for example, U.S. Pat. No. 3,804,831, 3,810,932, 3,846,069, 3,869,498 and 3,958,933. Examples of such dyes are listed in Table III.

TABLE III

1-{4-[N-2-phenylethyl-N-(2-hydroxyethyl)amino]-
  phenyl}2-cyano-2-(methoxycarbonyl)ethene
1-{4-[N,N-bis(2-hydroxyethyl)amino]phenyl}2-cyano-
  2-benzenesulfonylethene
1-{4-[N,N-bis(2-hydroxyethyl)amino]phenyl}2-ben-
  zoylethene
1-{4-[N,N-bis(2-hydroxyethyl)amino]-2-methyl-
  phenyl}2,2-bis-cyanoethene
1-{4-[N-ethyl-N-(2-hydroxyethyl)amino]-2-methyl-
  phenyl}2-cyano-2-(ethoxycarbonyl)ethene
1-{4-[dimethylamino]phenyl}-2-cyano-2-[(2-hydroxy)-
  carboethoxy]ethene
1-{4-[dimethylamino]phenyl}-2-cyano-2-[(2,3-dihy-
  droxy)carbopropoxy]ethene
1-{4-[N-(3-pyridyl-2)propyl-N-(2-hydroxyethyl-
  )amino]phenyl}-2-cyano-2-carboethoxyethene
1-{4-[N-(2-hydroxyethyl)]phenyl}-1,2,2-tricyanoethene
1-{4-[N,N-bis(2-hydroxyethyl)amino]phenyl}-2,2-bis(-
  trifluoromethylsulfonyl)ethene.
1-{4-[N,N-bis(2-hydroxyethyl)amino]phenyl}-1-carbo-
  ethoxy-2,2-dicyanoethene.
1-{4-[N-methyl-N-(2-hydroxyethyl)amino]-2-chloro-
  phenyl}-2,2-dicyanoethene.
1-{4-[N,N-dimethyl]amino-2-chlorophenyl}-2-carboe-
  thoxy-2-(2-hydroxyethyl carbonyl)ethane
1-{4-[N,N-dimethyl]aminophenyl}-2-acetyl-2-carboe-
  thoxyethene
1-{4-[N,N-dimethyl]aminophenyl}-1-[(2-hydroxye-
  thyl)carbonyl]-2,2-dicyanoethene
1-{4-[N,N-bis(2-hydroxyethyl)amino]-2-bromophenyl}-
  2-cyano-2-[(2,3-dihydroxy)carbopropoxy]ethene The volatility of the silyl-substituted dyes of the invention and the fastness or substantivity of the transferred dyes of polyester substrates is determined and compared with the corresponding non-silyl-substituted dyes as follows: Poly(vinylalcohol)-sized paper is coated at a wet thickness of about 40 microns with a solution of 4.0 g of the dye and 10.0 g of cellulose acetate/propionate (Eastman "ECAP") in 100 g of acetone and air dried. Samples of the dye coated paper are then used in tests as follows:

Volatility Test

Samples of dye coated paper prepared as described above are placed on the nonadhesive side of a polyester pressure sensitive adhesive tape and heated in a press operating at 200° C. and 280 g/cm$^2$ for 15 seconds. The relative ease with which the dye is transferred and absorbed by the polyester of the tape is rated visually on a scale of 1 to 5, with 5 being "excellent transfer and absorption" and 1 being "no transfer and absorption."

Dry Substantivity

Samples of polyester pressure sensitive adhesive tape, transfer printed with a dye in accordance with the above volatility test, are placed in an oven at 130° C. for two weeks, and the samples are removed from the oven and the appearance of the printed image rated visually on a scale of 1 to 5, with 5 being "essentially no change in appearance" and 1 being "complete disappearance of the image."

Wet Substantivity

Samples of polyester pressure sensitive adhesive tape transfer printed with dye as described in the above volatility test are adhered to strips of aluminum sheet and partially immersed in motor oil which is stirred and heated at 125°–130° C. After 4 hours, the samples are removed and the printed image rated visually on a scale of 1 to 5 as for the previous test.

As well as being useful in inks and colored plastics the dyes of the invention are particularly useful in imagewise combination with a substrate to provide transfer sheets for heat transfer of an image to a second substrate. Using this embodiment of the invention images are obtained which have high optical density and are resistant to bleaching or diffusion at high temperatures or in fluid environments.

The transfer sheets of the invention are prepared by the imagewise application of a printing composition comprising the dye of the invention in a suitable binder onto a carrier sheet which may be paper with or without loading or impregnants such as poly(vinyl alcohol), metal foil, such as aluminum foil, or a polymer film, such as a polyester or regenerated cellulose film. The printing composition is applied in a predetermined pattern to the carrier sheet by gravure, lithographic, letterpress, silkscreen, or the like, printing process. Volatile dyes of more than one color can be applied each in its respective predetermined pattern as in a conventional heat transfer process. The transfer sheet of the invention can then be used in conventional heat transfer printing to apply images to substrates of woven or nonwoven fabrics or films of materials such as cellulose derivatives, polyesters, polyamides and the like. In another embodiment of the invention, a printing composition comprising dyestuff of the invention is applied as a continuous coating onto a substrate or carrier sheet such as paper or metal foil which is then used to apply indicia to a substrate such as a tape, fabric or film utilizing a stencil of bas-relief-imaged heat-conductive platen in accordance with U.S. Pat. No. 4,063,878.

The printing composition suitably comprises dyestuff of the invention as a solution or partially dissolved and partially dispersed in a volatile organic solvent in combination with a soluble polymer which is not appreciably softened at the temperature of the transfer printing process, that is with a $T_G$ not below the temperature of transfer. Suitably the polymer is not softened at temperatures below about 100° C. ($T_G > 100$) and preferably below about 150° C. and more preferably below about 200° C. Particularly useful polymers include cellulose derivatives such as Eastman ECAP (cellulose acetate-propionate available from Eastman Kodak Co.). Useful solvents include esters, ketones and alcohols such as butyl acetate, acetone and ethanol. Generally, the printing composition comprises from about 0.1 to 1 part or more and preferably from about 0.3 to 0.5 parts by weight of volatile, hydrolyzable-silyl-substituted dyestuff of the invention per part by weight of soluble polymer in about 20 to 200 parts by weight volatile organic solvent.

Having thus described the invention in broad terms it is now more specifically illustrated by the following examples.

EXAMPLE 1

In a flame dried 250 ml, three-necked flask equipped with magnetic stirring bar, reflux condenser with nitrogen inlet and rubber septum on one side neck, are placed 1.63 g (5.0 mmol) 1,4-bis(2-hydroxyethylamino)anthraquinone (C.I. Disperse Blue 23, available as Disperse Blue NSP from Inmont Corporation), 4 ml triethylamine and 50 ml tetrahydrofurane (THF) (Aldrich, freshly opened). The mixture is purged with nitrogen and stirred until the dye is at least partially dissolved and 1.55 ml (12 mmol) trimethylchlorosilane is added to the mixture during a two minute period by means of a syringe having its needle through the septum. A mild exothermic reaction occurs and a precipitate forms immediately. The color of the mixture remains deep blue throughout the reaction. After stirring overnight, the reaction mixture is filtered and the whitish solid (triethylamine hydrochloride) washed with fresh THF until it remains white. The filtrate is evaporated on a rotary evaporator and the residue recrystallized from hot hexane. 1,4-Bis(2-trimethylsilyloxyethylamino)anthraquinone is obtained in two crops of blue needles in 86% yield, m.p. 123°–126° C.

Calculated for $C_{24}H_{34}N_2O_4Si_2$: C=61.24%; H=7.29%; N=5.95%. Found. C=60.5%; H=7.2%; N=5.9%.

EXAMPLES 2–13

Other silyl-substituted anthraquinone dyestuffs of the invention are prepared in accordance with the procedure given in Example 1 using in place of 1,4-bis(2-hydroxyethylamino)anthraquinone an equivalent amount of the anthraquinones of formula III in which $R^4$ is 4-$NR^3Q$, $R^3$ is H and one Q is derived from $R^9$ and the other Q is derived from $R^{10}$ as set forth in Table IV and in Examples 9–10 using t-butyldimethylsilyl chloride instead of trimethylsilyl chloride. These anthraquinones are prepared by procedures well known in the art. 1,4-Bis(3-amino propylamino)anthraquinone for Example 10 is obtained as light blue granules m.p. 120°–2° C. from ethanol. Reported 135.5°–137° C. from petroleum solvent.

Transfer compositions of the above silylated dyestuffs of Examples 1–13 as well as of the unsilylated parent dyes are prepared using 0.4 g of each dye, 10 g of Eastman "ECAP" resin and 10 g acetone. Each coating composition is coated onto poly(vinylalcohol)-sized paper (available from various commercial sources such as Simpson-Lee Paper Co., Vicksburg, Mich.) at an approximate 4 micron thickness and air dried to provide dye transfer printing sheets. Volatility (A), dry substantivity (or fastness) (B) and hot oil substantivity (or fastness) (C) tests as described above are performed with each transfer sheet and the results recorded in Table IV.

It may be seen by inspection of Table IV that the results of Test A show that the silylated dyes are generally more volatile than the corresponding unsilylated dyes, and Tests B and C show that their resistance to diffusion from polyester is essentially the same as that of the unsubstituted dyes.

Table IV

| Ex. No. | Alkyl Groups | | Results of Volatility and Substantivity Tests | | | | | |
|---|---|---|---|---|---|---|---|---|
| | | | Unsilylated | | | Silylated | | |
| | | | A | B | C | A | B | C |
| 1 | $R^9 =$ | $R^{10} = CH_2CH_2OH$ | 2 | 4 | 4 | 5 | 4 | 3 |
| 2 | $R^9 =$ | $R^{10} = CH_2CH_2CH_2OH$ | 4 | 4 | 4 | 5 | 4 | 4 |
| 3 | $R^9 =$ | $R^{10} = CH_2CH_2OCH_2CH_2OH$ | 5 | 4 | 2 | 5 | 4 | 2 |
| 4 | $R^9 =$ | $R^{10} = CH_2CH(CH_3)OH$ | 1 | 4 | — | 3 | 3 | 4 |
| 5 | $R^9 =$ | $R^{10} = CH(CH_3)CH_2OH$ | 3 | 4 | — | 4 | 3 | 2 |
| 6 | $R^9 =$ | $R^{10} = CH(CH_2CH_3)CH_2OH$ | 4 | 4 | 3 | 4 | 4 | 2 |
| 7 | $R^9 =$ | $R^{10} = CH_2CH_2CH_2C(CH_3)_2CH_2OH$ | 2 | 4 | — | 3 | 4 | — |
| 8 | $R^9 = CH_3$, | $R^{10} = CH_2CH_2OH$ | 3 | 4 | — | 5 | 4 | — |
| 9 | $R^9 =$ | $R^{10} = CH_2CH_2NH_2$ | 5 | 5 | 5 | 5 | 4 | 4 |
| 10 | $R^9 =$ | $R^{10} = CH_2CH_2CH_2NH_2$ | 5 | 4 | 5 | 4 | 5 | 5 |
| 11 | $R^9 =$ | $R^{10} = CH_2CH_2NHCH_2CH_3$ | 4 | 5 | 4 | 5 | 4 | 4 |
| 12 | $R^9 =$ | $R^{10} = CH(CH_3)_2$ | 5 | 2 | 2 | — | — | — |
| 13 | $R^9 =$ | $R^{10} = CH_2CH_2CH(CH_3)_2$ | 5 | 3 | — | — | — | — |

EXAMPLE 14

The procedure of Example 1 is repeated using 1.03 g. (3.0 mmol) {4-[N,N-bis(2-hydroxyethyl)amino]-2-methylphenyl}(4-nitrophenyl)diazene (Transfer Red RA or Disperse Red 17 available from Atlantic Chemical Corp. and recrystallized from ethanol), 5 ml dimethyl formamide, 1.22 g (21 mmol) imidazole (as acid acceptor) and 1.20 g (8.0 mmol) t-butyldimethylsilylchloride. Soon after addition of the silyl chloride, the mixture crystallizes and is redissolved by the addition of 10 ml of dimethylformamide. The mixture is stirred for about 16 hours and volatile components removed at 50° C. at 0.05 mm Hg. The orange residue is extracted with 150 ml of hexane in portions and the extract concentrated on a rotary evaporator. Recrystallization of the concentrate from pentane yields 1.45 g of orange crystalline solid {4-[N,N-bis(2-dimethyl-t-butylsilyloxyethyl)amino]-2-methylphenyl}(4-nitrophenyl)diazene (85% of the theoretical) m.p. 108°–110° C.

Calculated for $C_{29}H_{48}N_4O_4Si_2$: C=60.80%; H=8.44%; N=9.78%. Found: C=60.77%; H=8.6%; N=9.7%.

EXAMPLES 15–18

Other silyl-substituted diazenes of the invention are prepared by the procedure of Example 14 using in place of {4-[N,N-bis(2-hydroxyethyl)amino]-2-methylphenyl}(4-nitrophenyl)diazene an equivalent amount of the diazenes of formula VII below (corresponding to formula IV above) in which X, Y and Z are as shown in Table V and silylating with trimethylsilyl chloride except for above Example 14. Dyestuffs for Examples 15 and 18 available from Atlantic Dyestuff Co., for Example 16 from American Color and Chemical Co., and for Example 17 from GAF Corp.

Table V

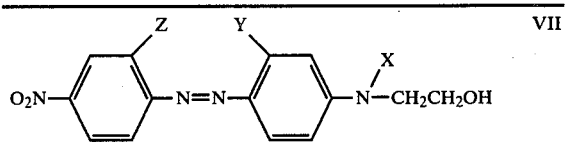

|  | Substituent in VII | | Results of Volatility and Substantivity Tests | | | | | |
|---|---|---|---|---|---|---|---|---|
|  |  |  | Unsilylated | | | Silylated | | |
| Ex. No. | X | Y | Z | A | B | C | A | B | C |
| 14 | CH₂CH₂OH | 2-CH₃ | H | 4 | 4 | 4 | 3 | 2 | 4 |
| 15 | CH₂CH₂OH | 2-CH₃ | H | 4 | 4 | 4 | 3 | 4 | 4 |
| 16 | CH₂CH₂OH | 2-Cl | H | 3 | 5 | 4 | 5 | 5 | 4 |
| 17 | CH₂CH₂OH | 2-Cl | CH₃ H | 4 |   | 3 | 5 |   | 3 |
| 18 | CH₂CH₃ | 2-Cl | H | 5 | 3 | 4 | 5 | 3 | 4 |

EXAMPLES 19–27

Table VI lists other silyl-substituted anthraquinone dyestuffs of the invention prepared by the procedure of Example 1 using as the hydroxyalkylaminoanthraquinone of formula III either bis(2-hydroxyethylamino)-, bis(2-hydroxy-1-methylethylamino)-, or bis(2-hydroxy-2-methylethylamino)anthraquinone as parent anthraquinone in Examples 19 through 24, 25 and 26 and Example 27, respectively, and silylating with one of dimethylhydrosilylchloride (Examples 19, 25), dimethylchloromethylsilylchloride (Examples 20, 26, 27), dimethyl-i-propylsilylchloride (Example 21), dimethyl-t-butylsilylchloride (Example 22), dimethylphenylsilylchloride (Example 23) or triethylsilylchloride (Example 24). The melting point of silylated dyestuffs, their relative volatilty (A) and dry (B) and hot oil (C) substantivity determined on transfer sheets prepared as above are tabulated in Table VI.

Table VI

| Ex. No. | Q of Formula III | Melting Point | Volatility and Substantivity | | |
|---|---|---|---|---|---|
|  |  |  | A | B | C |
| 19 | CH₂CH₂OSi(CH₃)₂H | 93°–95° | 5 | 5 |  |
| 20 | CH₂CH₂OSi(CH₃)₂CH₂Cl | 115°–117° | 4 | 5 | 4 |
| 21 | CH₂CH₂OSi(CH₃)₂CH(CH₃)₂ | 118°–119° | 4 | 4 | 4 |
| 22 | CH₂CH₂OSi(CH₃)₂C(CH₃)₃ | 126°–128° | 3 | 4 | 4 |
| 23 | CH₂CH₂OSi(CH₃)₂C₆H₅ | 75°–77° | 3 | 5 | 3 |
| 24 | CH₂CH₂OSi(C₂H₅)₃ | 56°–58° | 4 | 4 | 3 |
| 25 | CH(CH₃)CH₂OSi(CH₃)₂H | oil | 5 | 4 | 4 |
| 26 | CH(CH₃)CH₂OSi(CH₃)₂CH₂Cl | 70°–73° | 4 | 5 | 4 |
| 27 | CH₂CH(CH₃)OSi(CH₃)₂CH₂Cl | 64°–66° | 4 |  | 3 |

EXAMPLE 28

In a 100 ml., flask equipped with magnetic stirring bar, are placed 3.6 g. (20 mmol) 4-(N-2-hydroxyethyl-N-methyl)-benzaldehyde, 50 ml. ethanol, and 2.0 g. (30 mmol) malononitrile. To this solution is added 0.5 ml. of piperidine. The mixture immediately becomes cloudy yellow and is stirred for 3 hr. The volatiles are removed at reduced pressure and the residue recrystallized from ethanol to yield 2.90 g. (64%) of 1,1-dicyano-2-[4-(N-methyl-N-2-hydroxyethylanilino)]ethene; mp. 111°–113°. To a solution of 0.68 g. of the above hydroxy ethene and 1.22 g. imidazole in 10 ml. dimethyl formamide under nitrogen atmosphere is added a solution of 1.20 g. is added a solution of 1.20 g. t-butyldimethylchlorosilane dissolved in 5 ml. dimethyl formamide after min. The volatiles are removed by distillation at room temperature and 0.05 mm. hg. pressure. The residue is recrystallized from hot toluene to yield 0.72 g. (71%) of 1,1-dicyano-2-[4-(N-2-t-butyldimethylsiloxyethyl-N-methylanilino]ethene mp. 98°–100°.

EXAMPLE 29

In a procedure adapted from J. Amer. Chem. So. 80, 2806 (1958) a 100 ml. flask equipped with a magnetic stirring bar is charged with 3.6 g. (20 mmol) N,N-bis(2-hydroxyethyl)-aniline and 10 ml. dimethylformamide and a solution of 2.6 g. (20 mmol) of tetracyanoethylene in 10 ml dimethylformamide is then added dropwise. A deep red color develops in the solution which is heated to 60° for 20 min., cooled, and then poured onto 100 g. of water and ice. A grey-red solid is collected and recrystallized from isopropanol to yield 4.30 g. (74%) of 1-{-[N-bis(trimethylsilyloxyethyl)amino]phenyl}-1,2,2-tricyanoethene, mp. 161°–162°.

EXAMPLE 30

In a flame-dried 100 ml., single-necked flask equipped with nitrogen inlet tube and magnetic stirring bar are placed 1.40 g. (5.0 mmol) of the dye of Example 29, 4 ml. triethylamine, and 50 ml. tetrahydrofuran. To this solution 1.60 ml. (12 mmol) of trimethylchlorosilane is added gradually from a syringe. Solid precipitates from the mixture is then stirred for 4 hr, filtered, and solvents evaporated from the filtrate at reduced pressure. Recrystallization from pentane yields 1.63 g. (77%) of 1{4[N-bis(2-trimethylsilyloxyethyl)amino]phenyl}-1,2,2-tricyanoethene, mp. 89°–90°.

EXAMPLE 31

In a flame-dried 50 ml., single-necked flask equipped with nitrogen inlet tube and magnetic stirring bar are placed 0.84 g. of the product of Example 29, 1.22 g. of imidazole, and 10 ml. of dimethylformamide. To this solution was added a solution of 1.20 g. of t-butyldimethylchlorosilane dissolved in 5 ml. dimethylformamide is added to the solution in the flask and the mixture is stirred for 18 hr. Volatiles are removed by distillation at room temperature and 0.05 mm hg pressure. The residue is extracted with two 25 ml. portions of hot hexane and filtered. The filtrate is evaporated and the residue recrystallized from pentane. The yield of reddish-brown granules of 1-{4-[N-bis(2-t-butyldimethylsilyloxyethyl)amino]phenyl}-1,2,2-tricyanoethene is 1.13 g. (74%), mp. 81–82.

What is claimed is:

1. A volatile, hydrolyzable dyestuff of the formula $$RA \mathbin{+} N-R]_n$$
$$\phantom{RA+}|\phantom{N}$$
$$\phantom{RA+N}R$$

wherein

A is a dyestuff nucleus which may be unsubstituted or substituted by auxochromic or bathochromic groups and is selected from anthraquinone, naphthoquinone, phenylazophenyl or styryl, n is 1, 2 or 3, R is H, alkyl of 1 to 6 carbon atoms, phenyl or Q, and at least one R is Q, Q is $-R^1-W-Si(R^2)_3$, $R^1$ is a divalent aliphatic group of 2 to 10 carbon atoms W is O, S or $NR^3$, $R^3$ is H, alkyl of 1 to 6 carbon atoms or phenyl and each $R^2$ is individually the same or different selected from hydrogen, hydrocarbyl, hydrocarbyloxy, chlorohydrocarbyl or bromohydrocarbyl, chlorohydrocarbyloxy, bromohydrocarbyloxy in which the sum of carbons is not greater than 12.

2. A volatile, hydrolyzable dyestuff according to claim 1 of the formula

[structure: anthraquinone with O, $NR^3Q$, and $(R^4)_m$ substituents]

wherein m is 0, 1, 2 or 3, each $R^4$ is independently a nonsalt auxochromic or bathochromic nucleus-substituting group selected from $NO_2$, Cl, Br, $R^3$, $OR^3$, $SR^3$, $NHR^3$ and $N(R^3)_2$ and, when in the 4, 5 or 8 position, $R^4$ is additionally selected from $NR^3Q$, Q is $-R^1-W-Si(R^2)_3$, $R^1$ is a nonhydrolyzable divalent aliphatic, cycloaliphatic or phenylaliphatic linking group of 2 to 10 carbon atoms and not more than one oxygen or nitrogen atom for each two carbon atoms and a plurality of oxygen or nitrogen atoms being separated from one another by at least two carbon atoms, any phenyl group being separated from W by at least two carbon atoms, W is O, S or $NR^3$, $R^3$ is H, alkyl of 1 to 6 carbon atoms or phenyl and each $R^2$ is individually the same or different selected from hydrogen, hydrocarbyl, hydrocarbyloxy, chlorohydrocarbyl, chlorohydrocarbyloxy, bromohydrocarbyloxy or bromohydrocarbyl in which the sum of carbons is not greater than 12.

3. A volatile, hydrolyzable dyestuff according to claim 1 wherein A is a diazene residue of the formula

[structure: $(R^4)_n$—phenyl—N=N—phenyl—$(R^4)_n$—NRQ]

wherein each n is independently 0, 1 or 2,

R is H, alkyl of 1 to 6 carbon atoms, each $R^4$ group is independently a nonsalt auxochromic or bathochromic nucleus substituting group selected from $NO_2$, Cl, Br, $R^3$, $OR^3$, $SR^3$, $NHR^3$ and $N(R^3)_2$ and $R^3$ is H, alkyl of 1 of 6 carbon atoms or phenyl.

4. A volatile, hydrolyzable dyestuff according to claim 1 of the formula

[structure: $R^6C(R^5)=C(R^7)$—phenyl$(R^4)_p$—N(R)—R]

wherein p is 0, 1 or 3

R is H, alkyl of 1 to 6 carbon atoms, phenyl or Q, and at least one R is Q,

Q is $-R^1-W-Si(R^2)_3$, $R^1$ is a nonhydrolyzable divalent aliphatic, cycloaliphatic or phenyl aliphatic linking group of 2 to 10 carbon atoms and not more than one oxygen or nitrogen atom for each two carbon atoms and a plurality of oxygen or nitrogen atoms being separated from one another by at least two carbon atoms, any phenyl group being separated from W by at least two carbon atoms, W is O, S or $NR^3$, $R^3$ is H, alkyl of 1 to 6 carbon atoms or phenyl and each $R^2$ is individually the same or different selected from hydrogen, hydrocarbyl, hydrocarbyloxy, chlorohydrocarbyl, chlorohydrocarbyloxy, bromohydrocarbyloxy, or bromohydrocarbyl in which the sum of carbons is not greater than 12, individually $R^5$ and $R^6$ are CN, $SO_2R^8$, $R^3$, COOR or phenyl substituted by one of Cl, $CH_3$ or $OCH_3$ and $R^8$ is $CF_3$, alkyl, cycloalkyl or aryl of 1 to 7 carbon atoms, and together $R^5$ and $R^6$ and the adjacent carbon atom are

[structures: benzothiazole and benzoxazole moieties with $R^3$, $(R^4)_p$]

5. The volatile, hydrolyzable dyestuff according to claim 2 wherein m is 1, $R^4$ is $-NR^3Q$, $R^3$ is H and Q is $-CH_2CH_2OSi(CH_3)_3$.

6. The volatile, hydrolyzable dyestuff according to claim 2 wherein m is 1, $R^4$ is $-NR^3Q$, $R^3$ is H and Q is
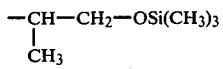
7. The volatile, hydrolyzable dyestuff according to claim 2 wherein m is 1, $R^4$ is $-NR^3Q$, $R^3$ is H and Q is
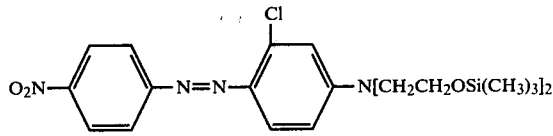
8. The volatile, hydrolyzable dyestuff according to claim 3 of the formula
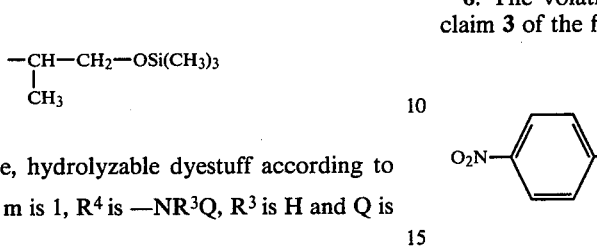
* * * * *

UNITED STATES PATENT AND TRADEMARK OFFICE
CERTIFICATE OF CORRECTION

PATENT NO. : 4,189,429

DATED : February 19, 1980

INVENTOR(S) : Robert L. Lambert, Jr.

It is certified that error appears in the above—identified patent and that said Letters Patent is hereby corrected as shown below:

Column 1, line 22, "3,806,069" should read -- 3,846,069 --.

Column 2, line 37, "chlorohydrocarbyloxy or bromohy-" should read -- chlorohydrocarbyloxy, bromohydrocarbyl, or bromohy- --.

Column 2, line 59, "and R is" should read -- and $R^4$ is --.

Column 4, line 14, "47003e" should read -- 4703e --.

Column 5, line 8, "-hydroxethyl)" should read -- -hydroxyethyl) -

Column 5, line 14, "-hydroxethyl)" should read -- -hydroxyethyl)-

Column 6, line 7, "of Polyester" should read -- to polyester --.

Column 10, line 48, "1-{-[N-bis" should read -- 1-{4-[N-bis --.

UNITED STATES PATENT AND TRADEMARK OFFICE
CERTIFICATE OF CORRECTION

PATENT NO. : 4,189,429

DATED : February 19, 1980

INVENTOR(S) : Robert L. Lambert, Jr.

It is certified that error appears in the above—identified patent and that said Letters Patent is hereby corrected as shown below:

Column 10, line 62, "1-{4[N-bis" should read -- 1-{4-[N-bis --.

Column 11, lines 34-36, should read -- lected from hydrogen, hydrocarbyl, chlorohydrocarbyloxy, bromohydrocarbyloxy hydrocarbyloxy, chlorohydrocarbyl or bromohydrocarbyl --.

Column 12, line 32, "0, 1 or 3" should read -- 0, 1, 2 or 3 --.

Signed and Sealed this

Twenty-fourth Day of June 1980

[SEAL]

Attest:

SIDNEY A. DIAMOND

Attesting Officer     Commissioner of Patents and Trademarks